(12) United States Patent
Choi et al.

(10) Patent No.: US 10,229,050 B2
(45) Date of Patent: Mar. 12, 2019

(54) METHOD FOR OPERATING STORAGE CONTROLLER AND METHOD FOR OPERATING STORAGE DEVICE INCLUDING THE SAME WHEREIN GARBAGE COLLECTION IS PERFORMED RESPONSIVE TO FREE BLOCK UNAVAILABLE DURING REUSE

(71) Applicant: SAMSUNG ELECTRONICS CO., LTD., Suwon-si, Gyeonggi-Do (KR)

(72) Inventors: Hyun Jin Choi, Suwon-si (KR); Dong-Young Seo, Suwon-si (KR); Sang Kwon Moon, Osan-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 148 days.

(21) Appl. No.: 15/295,575

(22) Filed: Oct. 17, 2016

(65) Prior Publication Data
US 2017/0168930 A1 Jun. 15, 2017

(30) Foreign Application Priority Data
Dec. 15, 2015 (KR) ........................ 10-2015-0179000

(51) Int. Cl.
*G06F 12/02* (2006.01)
*G06F 3/06* (2006.01)
(52) U.S. Cl.
CPC ............ *G06F 12/0246* (2013.01); *G06F 3/06* (2013.01); *G06F 2212/1044* (2013.01); *G06F 2212/7205* (2013.01)

(58) Field of Classification Search
None
See application file for complete search history.

(56) References Cited

U.S. PATENT DOCUMENTS

| 7,707,232 | B2 | 4/2010 | Dussud et al. | |
| 8,250,324 | B2 | 8/2012 | Haas et al. | |
| 8,681,554 | B2 | 3/2014 | Suzuki | |
| 8,949,491 | B1 | 2/2015 | Lin et al. | |
| 8,949,555 | B1* | 2/2015 | Karamcheti | G06F 12/0246 |
| | | | | 711/158 |
| 9,639,463 | B1* | 5/2017 | Kankani | G06F 12/0261 |
| 9,652,382 | B1* | 5/2017 | Subramanian | G06F 12/0246 |
| 2002/0097594 | A1* | 7/2002 | Bruce | G06F 12/0804 |
| | | | | 365/189.16 |

(Continued)

FOREIGN PATENT DOCUMENTS

| JP | 2012014400 | 1/2012 |
| KR | 0101545 B1 | 3/1996 |
| KR | 1029704 A | 12/2009 |

*Primary Examiner* — Ann J Lo
*Assistant Examiner* — Chie Yew
(74) *Attorney, Agent, or Firm* — Volentine, Whitt & Francos, PLLC

(57) ABSTRACT

A method of operating a storage controller, for controlling a garbage collection operation so that blocks included in a non-volatile memory satisfy reuse constraints, includes determining whether the number of free blocks among the blocks is smaller than a first reference value for triggering a garbage collection operation and performing the garbage collection operation on the blocks until the number of free blocks is equal to a second reference value larger than the first reference value according to a result of the determination.

17 Claims, 8 Drawing Sheets

(56) References Cited

U.S. PATENT DOCUMENTS

| | | | |
|---|---|---|---|
| 2007/0103960 A1* | 5/2007 | Hamberg | G06F 12/0238 |
| | | | 365/145 |
| 2010/0057976 A1* | 3/2010 | Lasser | G06F 13/385 |
| | | | 711/103 |
| 2012/0023376 A1* | 1/2012 | Jeddeloh | G06F 11/073 |
| | | | 714/47.2 |
| 2012/0159051 A1* | 6/2012 | Hida | G06F 12/0246 |
| | | | 711/103 |
| 2012/0311232 A1* | 12/2012 | Porterfield | G11C 16/3495 |
| | | | 711/103 |
| 2013/0060991 A1* | 3/2013 | Lee | G06F 12/0246 |
| | | | 711/103 |
| 2013/0145085 A1* | 6/2013 | Yu | G06F 12/0246 |
| | | | 711/103 |
| 2014/0047169 A1 | 2/2014 | Seo et al. | |
| 2014/0181376 A1 | 6/2014 | Miyamoto et al. | |
| 2015/0161034 A1* | 6/2015 | Fisher | G06F 12/0246 |
| | | | 711/103 |
| 2015/0179274 A1 | 6/2015 | Kim et al. | |
| 2016/0092122 A1* | 3/2016 | Agrawal | G06F 3/0616 |
| | | | 711/103 |

\* cited by examiner

Erase Table

| Block Index | Erased Time(tE) |
|---|---|
| BL1 | tE1 |
| BL2 | tE2 |
| BL3 | tE3 |
| ⋮ | ⋮ |
| BL15 | tE15 |
| BL16 | tE16 |
| BL17 | tE17 |
| BL18 | tE18 |
| BL19 | tE19 |
| BL20 | tE20 → tE'20 |

METHOD FOR OPERATING STORAGE CONTROLLER AND METHOD FOR OPERATING STORAGE DEVICE INCLUDING THE SAME WHEREIN GARBAGE COLLECTION IS PERFORMED RESPONSIVE TO FREE BLOCK UNAVAILABLE DURING REUSE

CROSS-REFERENCE TO RELATED APPLICATION

This application claims priority under 35 U.S.C. § 119(a) from Korean Patent Application No. 10-2015-0179000 filed on Dec. 15, 2015, the disclosure of which is hereby incorporated by reference in its entirety.

BACKGROUND

Embodiments of the present disclosure relate to a method of operating a storage controller, and more particularly to a method of operating a storage controller for improving reliability of data by adjusting the number of free blocks included in a non-volatile memory and a method of operating a storage device including the storage controller.

A non-volatile memory (for example, flash memory) may include a plurality of blocks, and each of the blocks may include a plurality of pages. Each of the blocks is programmed with data in an erased state, and the blocks need to be erased again when the blocks are programmed with data again. In this manner, blocks go through a cycle process of being repeatedly programmed and erased in a storage device. When the blocks are reused within a short period of time (for example, an erase interval of a block is short), a period in which data stored in a block can be maintained without an error may be shortened. Therefore, reliability of a flash memory may be lowered.

SUMMARY

An example embodiment of the present disclosure is directed to a method of operating a storage controller. The method includes determining whether the number of free blocks among blocks of a nonvolatile memory device is less than a first reference value for triggering a garbage collection operation and performing the garbage collection operation on the blocks until the number of free blocks is equal to a second reference value larger than the first reference value, according to a result of the determination.

Another example embodiment of the present disclosure is directed to a method of operating a storage device including a non-volatile memory and a controller for controlling the non-volatile memory device. The method includes determining, by the controller, whether the number of free blocks among blocks included in the non-volatile memory is smaller than a reference value, performing a first garbage collection until the number of free blocks is equal to the reference value, and performing a second garbage collection based on a reuse period of a first free block generated by the first garbage collection.

Another example embodiment of the present disclosure is directed to a method, executed by a memory controller, of controlling a nonvolatile memory whose memory cells are erased in units of memory blocks. The method includes executing a first garbage collection operation to recover, for reuse, one or more free memory blocks among all memory blocks of the nonvolatile memory. A second garbage collection operation is executed to recover, for reuse, a number of additional free memory blocks among all of the memory blocks of the nonvolatile memory when a particular free memory block recovered by the first garbage collection operation is expected to be unavailable for reuse at an expected reuse time. Each of the free memory blocks is unavailable for reuse when a period since the free memory block's last erasure is less than a minimum delay period and is otherwise available.

BRIEF DESCRIPTION OF THE DRAWINGS

These and/or other aspects and advantages of the present general disclosure will become apparent and more readily appreciated from the following description of the embodiments, taken in conjunction with the accompanying drawings of which.

DETAILED DESCRIPTION OF THE EMBODIMENTS

Figure 1:
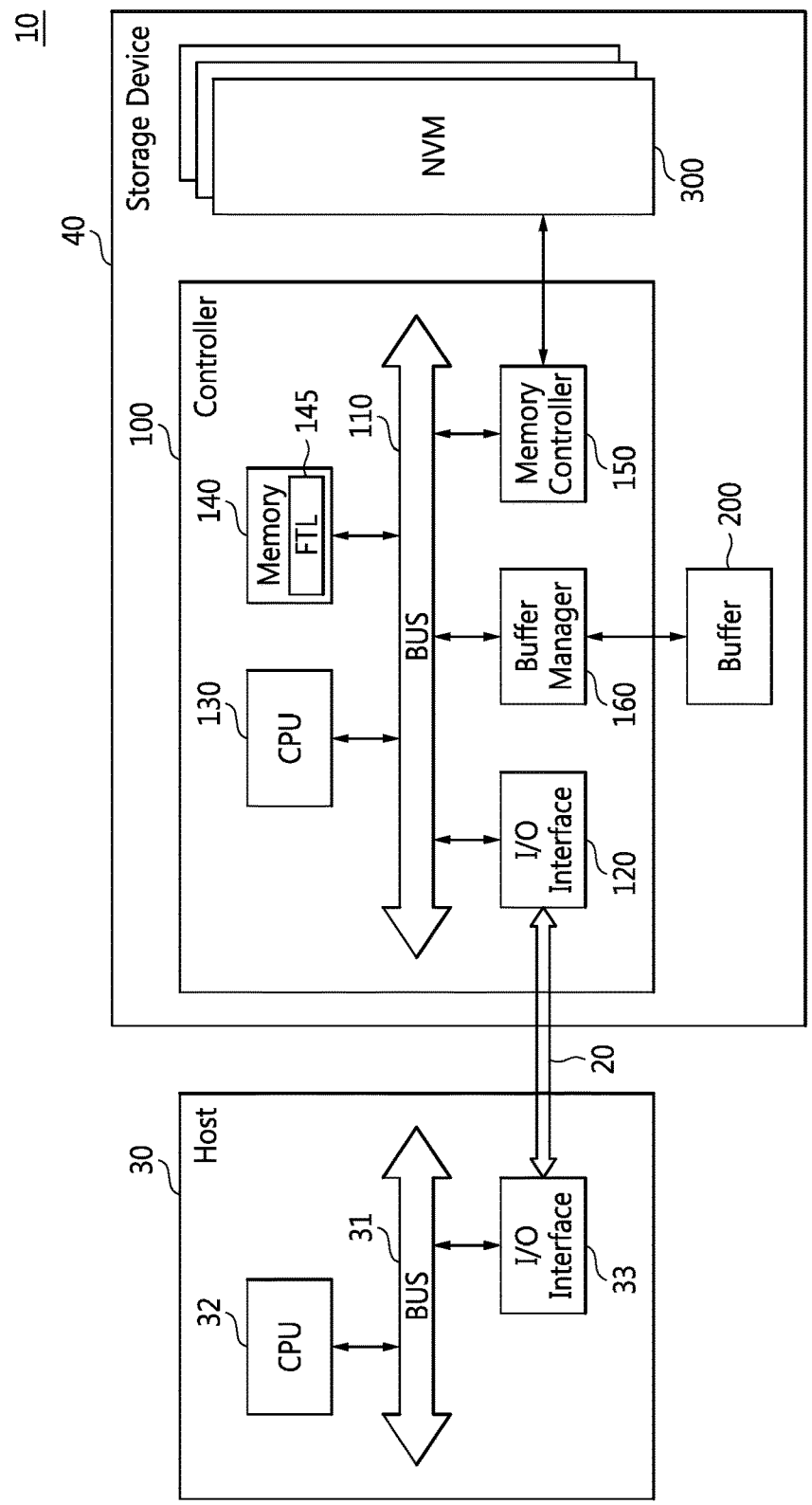
FIG. 1 is a block diagram which shows a schematic configuration of a data processing system according to an embodiment of the present disclosure.

Reference will now be made in detail to the embodiments of the present general disclosure, examples of which are illustrated in the accompanying drawings, wherein like reference numerals refer to the like elements throughout. The embodiments are described below in order to explain the present general disclosure by referring to the figures.

FIG. 1 is a block diagram which shows a schematic configuration of a data processing system according to an embodiment of the present disclosure. Referring to FIG. 1, a data processing system 10 may include a host 30 and a storage device 40 connected to each other through an interface 20. The data processing system 10 may be embodied in a PC, a desk-top computer, a lap-top computer, a workstation computer, or a mobile computing device; however, it is not limited thereto.

The mobile computing device may be embodied in a mobile phone, a smart phone, a tablet PC, a personal digital assistant (PDA), an enterprise digital assistant (EDA), a digital still camera, a digital video camera, a portable multimedia player (PMP), a multimedia device, a personal navigation device or portable navigation device (PND), a handheld game console, a mobile internet device (MID), a wearable device (or wearable computer), an internet of things (IoT) device, an internet of everything (IoE) device, or an e-book.

The interface 20 may be embodied in a serial advanced technology attachment (SATA) interface, a SATA express (SATAe) interface, a serial attached small computer system interface (SCSI), a peripheral component interconnect express (PCIe) interface, a non-volatile memory Express (NVMe) interface, an advanced host controller interface (AHCI), a NAND-type flash memory interface, or a multimedia card (MMC) interface; however, it is not limited thereto. According to exemplary embodiments, the interface 20 may transmit electrical signals or optical signals.

The host 30 may control a data processing operation (or a write operation (or a program operation) or a read operation) of the storage device 40 through the interface 20. For example, the host 30 may refer to a host controller. According to exemplary embodiments, the host 30 may be embodied in an integrated circuit (IC), a motherboard, an application processor (AP), a mobile AP, a system on chip (SOC), or a set of chips.

The host 30 may include a CPU 32 and an interface 33 which can transmit or receive signals (or data) to or from each other through a bus 31. The block diagram of the host 30 is exemplarily shown in FIG. 1; however, a technical concept of the present disclosure is not limited to the block diagram shown in FIG. 1.

The bus 31 may be embodied in an advanced microcontroller bus architecture (AMBA), an advanced high-performance bus (AHB), an advanced peripheral bus (APB), an advanced eXtensible interface (AXI), an advanced system bus (ASB), or a combination of these; however, it is not limited thereto.

The CPU 32 may generate a write request for controlling a write operation of the storage device 40 or a read request for controlling a read operation of the storage device 40. The write request may include a write address, and the read request may include a read address. The request may refer to a command. According to exemplary embodiments, the CPU 32 may include one or more cores.

The interface 33 may change a format of a command and/or data to be transmitted to the storage device 40, and transmit a changed command and/or data to the storage device 40 through the interface 20. Moreover, the host interface 33 may change a format of a response and/or data transmitted from the storage device 40 and transmit a changed response and/or data to the CPU 32 through the bus 31. According to an exemplary embodiment, the interface 33 may include a transceiver for transmitting or receiving a command or data. A structure and an operation of the interface 33 may be embodied to be suitable for a structure and an operation of the interface 20.

The storage device 40 may be embodied in a flash-based memory device; however, it is not limited thereto. For example, the storage device 40 may be embodied in a smart card, a secure digital (SD) card, a multimedia card (MMC), an embedded MMC (eMMC), an embedded multi-chip package (eMCP), a perfect page NAND (PPN), a universal flash storage (UFS), a USB flash drive, a solid stage drive (SSD), or an embedded SSD (eSSD).

The storage device 40 may include a controller 100, a buffer 200, and non-volatile memories 300. The storage device 40 may store data output from the host 30 in at least one of the non-volatile memories 300 according to a control of the controller 100.

The controller 100 may control data transmitted or received between the host 30 and the non-volatile memories 300. According to exemplary embodiments, the controller 100 may be embodied in an IC or an SoC. The controller 100 may include a bus 110, a host interface 120, a CPU 130, a memory 140, a memory controller 150, and a buffer manager 160. The bus 110 may be embodied in an AMBA, AHB, APB, AXI, ASB, or a combination of these; however, it is not limited thereto.

The host interface 120 may change a format of a response or data to be transmitted to the host 30, and transmit a changed response or data to the host 30 through the interface 20. Moreover, the host interface 120 may receive a command or data transmitted from the host 30, change a format of a received command or data, and transmit a changed command or data to the CPU 130 and/or the buffer manager 160. According to an exemplary embodiment, the host interface 120 may include a transceiver for transmitting or receiving a signal and/or data. A structure and an operation of the host interface 120 may be embodied to be suitable for a structure and an operation of the interface 20.

The CPU 130 may control the host interface 120, the memory 140, the memory controller 150, and the buffer manager 160 through the bus 110. The CPU 130 may execute firmware (or a computer program) for controlling an operation of the storage device 40. An operation of the firmware executed by the CPU 130 will be described in detail referring to FIGS. 5 to 11.

For convenience of description, one CPU 130 is shown in FIG. 1; however, the controller 100 may include a first CPU for processing a command and/or data output from the host 30 and a second CPU for controlling an access operation (for example, a write operation, a read operation, an erase operation and/or a copy-back operation) for the non-volatile memories 300 according to exemplary embodiments.

The memory 140 may store data necessary for an operation of the controller 100 or data generated by a data processing operation (for example, a write operation or a read operation) performed by the controller 100. According to exemplary embodiments, the memory 140 may be embodied in a random access memory (RAM), a dynamic RAM (DRAM), a static RAM (SRAM), a buffer, a buffer memory, a cache, or a tightly coupled memory (TCM); however, it is not limited thereto.

The memory 140 may store a flash translation layer (FTL) 145 loaded from at least one of the non-volatile memories 300. The FTL 145 may refer to an address mapping for mapping a logical address output from the host 30 onto a physical address of the non-volatile memories 300, a wear-leveling, and/or firmware for performing a garbage collection.

The memory controller 150 may control data processing operations (for example, a write operation, a read operation, an erase operation and/or a copy-back operation) for the non-volatile memories 300 according to a control of the CPU 130. For example, when the non-volatile memories 300 are embodied in a flash memory, the memory controller 150 may perform a function of a flash memory controller. The memory controller 150 and the non-volatile memories 300 may transmit or receive a control signal and/or data to or from each other through channels.

The memory controller 150 may control performance of a garbage collection on blocks included in the non-volatile memories 300. According to exemplary embodiments, the memory controller 150 may manage mapping information and erased time of blocks related to the performance of a garbage collection and manage a list of free blocks. According to exemplary embodiments, the memory controller 150 may support an SATA interface, an SATAe interface, an SAS, a PCIe interface, an NVMe interface, an AHCI, an MMC interface, a NAND-type flash memory interface, or a NOR-type flash memory interface; however, it is not limited thereto.

The buffer manager 160 may write data in the buffer 200 or read data from the buffer 200 according to a control of the CPU 130. For example, when a write command transmitted from the host 30 is processed, the buffer manager 160 may temporarily store write data transmitted from the host 30 in the buffer 200 according to the write command and transmit the write data temporarily stored to the non-volatile memories 300 through the memory controller 150.

The buffer 200 may store a mapping table for a logical address to a physical address conversion of the non-volatile memories 400, an erase table in which a latest erased time for each of the blocks included in the non-volatile memories 300 is recorded, and a list of free blocks. The mapping table, the erase table, and the list of free blocks may be updated by the FTL 145. The buffer 200 may perform a function of a cache for temporarily storing write data to be transmitted to the non-volatile memories 300. The buffer 200 may be embodied in a RAM, a SRAM, or a DRAM; however, it is not limited thereto.

When the controller 100 and the buffer 200 are embodied in different semiconductor chips, the controller 100 and the buffer 200 may be embodied in a package, for example, a package on package (PoP), a multi-chip package (MCP), or a system in package (SiP).

The non-volatile memories 300 may store an operation system (OS), various types of programs, and various types of data. Each of the non-volatile memories 300 may include at least one memory cell array. Each of the non-volatile memories 300 may be embodied in a semiconductor chip or a semiconductor package.

At least one channel may be disposed (or formed) between the non-volatile memories 300 and the memory controller 150. The channel may include transmission lines for transmitting a command and/or data. According to exemplary embodiments, the non-volatile memories 300 may be embodied in an A channel*B way. Here, each of A and B may be a natural number of two or more.

The memory cell array may include a two-dimensional memory cell array or a three-dimensional memory cell array.

Figure 2:
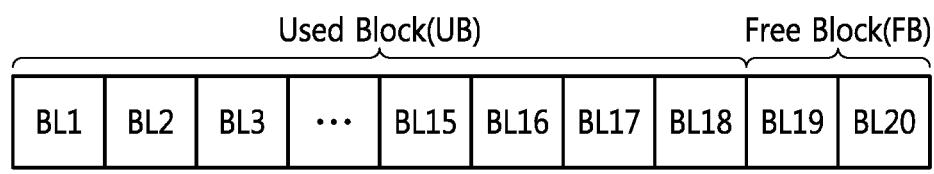
FIG. 2 is a block diagram which shows blocks included in non-volatile memories of FIG. 1.
Figure 3:
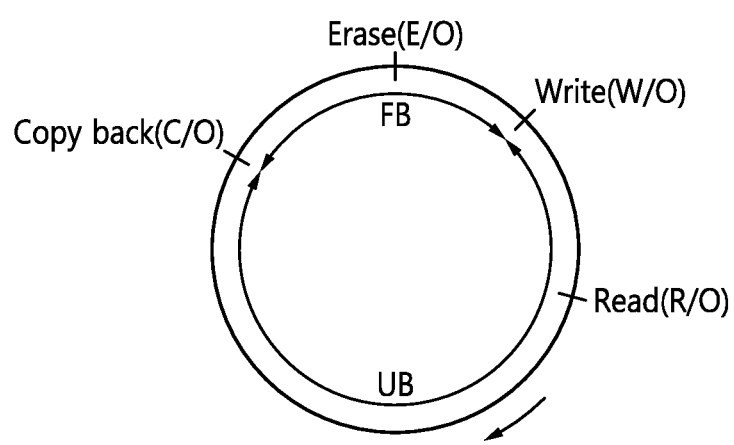
FIG. 3 is a conceptual diagram which shows a P/E cycle process of the blocks of FIG. 2.

FIG. 2 is a block diagram which shows blocks included in the non-volatile memories of FIG. 1, and FIG. 3 is a conceptual diagram which shows a P/E cycle process of the blocks of FIG. 2. Referring to FIGS. 1 to 3, each of the non-volatile memories 300 may include at least one memory cell array, and the memory cell array may include a plurality of blocks BL1 to BL20 (hereinafter, BLs). It is shown that a memory cell array includes 20 blocks BLs in FIG. 2; however, a technical concept of the present disclosure is not limited to the number of blocks shown in FIG. 2.

Each of the blocks BLs may include a plurality of pages. An erase operation (E/O) may be performed by block, and a write operation (W/O), a read operation (R/O), or a copy back operation (C/O) may be performed by page in the storage device 40.

Each of the blocks BLs may repeat an erase operation (E/O), a write operation (W/O), a read operation (R/O), and a copy back operation (C/O) according to a program-erase (P/E) cycle process. That is, after data stored in a block are all erased according to an erase operation (E/O), data may be stored in at least one of the pages in a block according to a write operation (W/O) again, and data stored in each page may be read according to a read operation (R/O). Then, a valid page among pages in a block is moved to another block according to a copy back operation (C/O), and data stored in the block may be all erased according to an erase operation (E/O) again.

A garbage collection operation may include a copy back operation (C/O) and/or an erase operation (E/O). The blocks BLs may be divided into a used block UB and a free block FB according to the P/E cycle process of FIG. 3. For example, the used blocks UB may be defined as blocks BL1 to BL18 present in a section between a first write operation (W/O) time after the erase operation (E/O) and a copy back operation (C/O), and blocks BL19 and B120 present in the other sections may be defined as the free blocks FB.

Figures 4, 5:
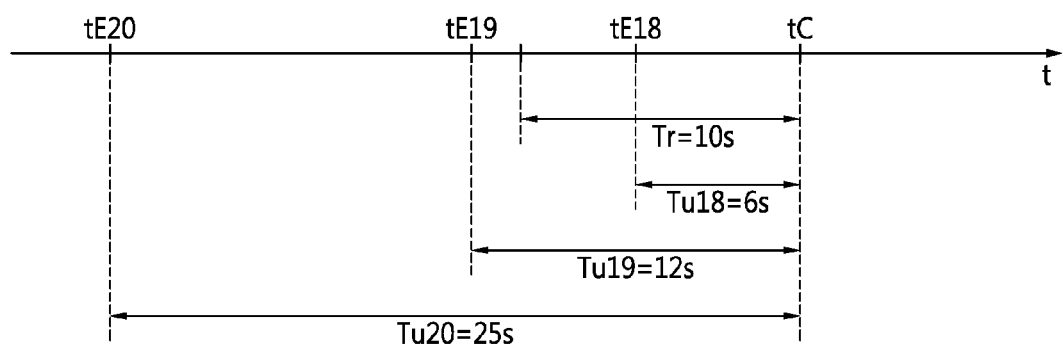
FIG. 4 is a table in which erased time of the blocks of FIG. 2 is recorded.
FIG. 5 is a time line for describing reuse constraints of the blocks of FIG. 2.

FIG. 4 is a table in which erased time of the blocks of FIG. 2 is recorded, and FIG. 5 is a time line for describing reuse constraints of the blocks of FIG. 2. Referring to FIGS. 1, 4, and 5, the controller 100 may generate an erase table for managing a latest erased time tE of blocks included in the non-volatile memories 300 and record an erased time tE for each of the blocks. The erased time tE may refer to a time when erasing of a corresponding block is started or completed. For example, the erased time tE may refer to a time stamp.

As shown in FIG. 4, the controller 100 may record the latest erased time tE1 to tE20 for each of the blocks BLs in the erase table, and update a first erased time tE20 of a block BL20 to be a second erased time tE'20 according to a P/E cycle.

The erase table may be stored in the buffer 200 or the non-volatile memory 300 of the storage device 40, and may be used to calculate a re-use period of each of the blocks BL1 to BL20.

The re-use period of a corresponding one of the blocks BL1 to BL20 refers to a difference between a time when the corresponding block is started to be used and a current time tC. Here, the time when the corresponding block is started to be used may refer to a latest erased time tE of the corresponding block.

When a time interval from when a current erase operation is performed until a next erase operation is performed is short according to the P/E cycle process, a period to maintain data stored in each page of a corresponding block without an error can be shortened.

The controller 100 may set reuse constraints of a block and manage a reuse of the block. For example, as shown in FIG. 5, the controller 100 may set a reuse constraint period (Tr) of each block, and determine whether a reuse period of the block exceeds the reuse constraint period Tr which is set.

Referring to FIG. 5, it is assumed that the reuse constraint period Tr is set to be T seconds (for example, T is a real number, e.g., 10 seconds). A reuse period Tu18 of an $18^{th}$ block BL18 may be a difference between a current time tC and a latest erased time tE18, that is, 6 seconds. A reuse period Tu19 of a $19^{th}$ block BL19 may be a difference between the current time tC and a latest erased time tE19, that is, 12 seconds. A reuse period Tu20 of a $20^{th}$ block BL20 may be a difference between the current time tC and a latest erased time tE20, that is, 25 seconds. The 10 seconds, 6 seconds, 12 seconds, and 25 seconds recorded herein are not more than an exemplary embodiment for description.

In this case, since the reuse periods Tu19 and Tu20 of each of the $19^{th}$ block BL19 and the $20^{th}$ block BL20 are longer than the reuse constraint period Tr, each of the $19^{th}$ block BL19 and the $20^{th}$ block BL20 may be a block which can be currently reused. On the other hand, the reuse period Tu18 of the $18^{th}$ block BL18 is shorter than the reuse constraint period Tr, the $18^{th}$ block BL18 cannot be a block which can be currently used, but can be a reusable block after a certain period of time (e.g., 4 seconds).

Figure 6:
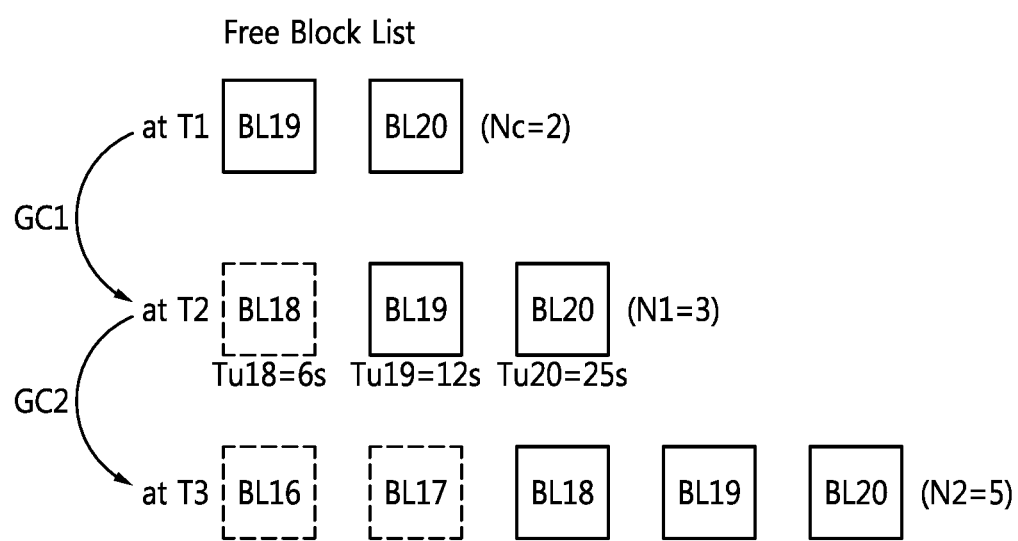
FIG. 6 is a conceptual diagram for describing a garbage collection operation performed by a controller of FIG. 1.
Figure 7:
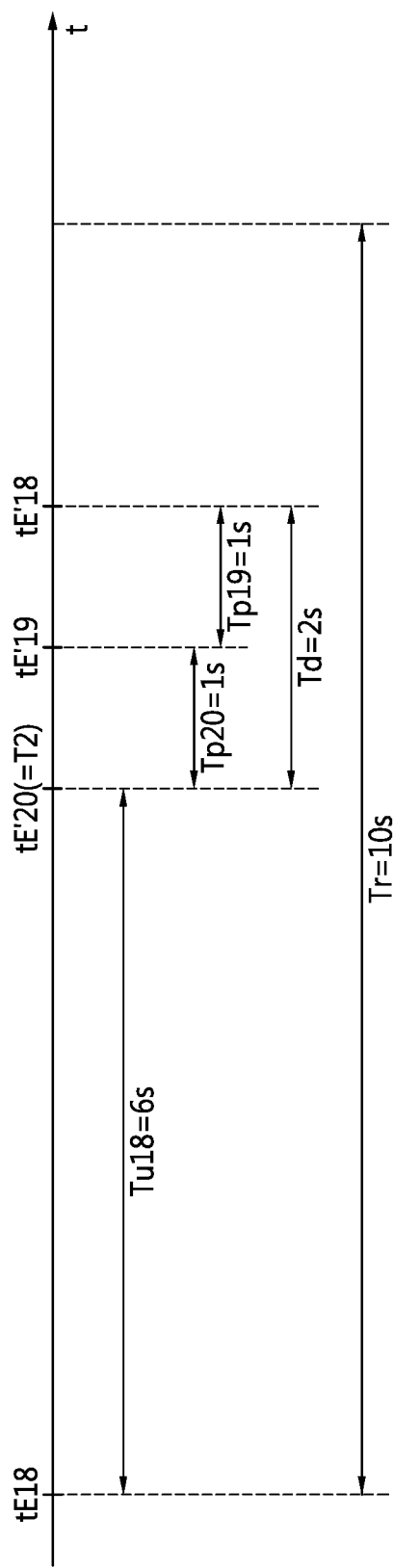
FIG. 7 is a time line for describing a process of deciding a second reference value for a performance of a second garbage collection of FIG. 6.

FIG. 6 is a conceptual diagram for describing a garbage collection operation performed by a controller of FIG. 1, and FIG. 7 is a time line for describing a process of deciding a second reference value for a performance of a second garbage collection of FIG. 6.

Referring to FIGS. 1, 2, 6 and 7, the controller 100 may manage a list of at least one free block FB among the blocks BLs included in the non-volatile memories 300.

When data and a write command are received from the host 30, the controller 100 may allocate one of free blocks to a data block, and write the data in an allocated data block. As a free block FB is changed to a used block UB, the number Nc of free blocks among the blocks may be decreased.

According to an exemplary embodiment, when there is no free block satisfying the reuse constraint period Tr among the free blocks, a free block may be limitedly allocated. That is, the controller 100 may stop to allocate a free block and hold a write operation until at least one of the free blocks satisfies a reuse period. When the number Nc of free blocks is equal to or smaller than a first reference value N1 which is set, the controller 100 may generate a new free block FB by performing a garbage collection operation on the blocks BLs.

The first reference value N1 may be a minimum value for a trigger (start) of a garbage collection operation, and the first reference value N1 may be set to be another value according to the FTL 145 performed by the controller 100.

The garbage collection operation may include a first garbage collection operation GC1 related to the first reference value N1 and a second garbage collection operation GC2 related to the second reference value N2. The first garbage collection operation GC1 and the second garbage collection operation GC2 may be successively performed.

The first garbage collection operation GC1 may be performed until the number Nc of free blocks is equal to the first reference value N1. The second garbage collection operation GC2 may be performed until the number of free blocks is larger than the first reference value N1 and is equal to the second reference value N2.

The second reference value N2 may be set to be a value larger than the first reference value N1, and may be set so that the free blocks satisfy reuse constraints when free blocks generated according to the first garbage collection operation are reused.

Hereinafter, a process of deciding the second reference value N2 will be described with an assumption that the first reference value N1 is 3.

At a time T1 when a first garbage collection GC1 is started, two free blocks BL19 and BL20 may be present. Since the number Nc of free blocks is smaller than the first reference value N1 (i.e., Nc=2<N1=3), the controller 100 may perform the first garbage collection operation GC1 on one or more blocks so that the number Nc of free blocks is equal to the first reference value N1. In this example, controller 100 performs the first garbage collection operation to generate one first free block BL18, so that the total number of free blocks becomes Nc=2=N1.

At a time T2 when the first garbage collection operation GC1 is completed, the controller 100 may determine whether the first free block BL18 satisfies reuse constraints. For example, as shown in FIG. 7, when a reuse period Tu18 of the free block BL18 is assumed to be 6 seconds, the controller 100 may determine that the first free block BL18 is a block not satisfying the reuse constraints since the reuse period (Tu18=6 seconds) of the first free block BL18 is smaller than the reuse constraint period (Tr=10 seconds).

At the time T2 when the first garbage collection operation GC1 is completed, since the first free block BL18 is a block not satisfying the reuse constraints, the controller 100 needs to generate at least one other free block.

A block which has a longer reuse period may be first reused. For example, at the time T2 when the first garbage collection operation GC1 is completed, a third free block BL20 having a reuse period Tu20 of 25 seconds may be firstly reused, and a second free block BL19 having a reuse period Tu19 of 12 seconds may be secondly reused.

As the third free block BL20 and the second free block BL19 are sequentially reused, a reuse delay period Td for delaying a reuse of the first free block BL18 (or increasing the reuse period of the first free block BL18) may be generated.

The reuse delay period Td may be calculated based on time consumed in programming data in each of the third free block BL20 and the second free block BL19.

For example, when it is assumed that the number of pages included in the third free block BL20 is 5, and time consumed in programming corresponding data in each page is 0.2 seconds, a delay period Tp of one second (=5*0.2 seconds) may be generated by a reuse of the second free block BL20. Moreover, when it is assumed that the number of pages including the second free block BL19 is 5 and time consumed in programming data in each page is 0.2 seconds, a delay period Tp of one second (=5*0.2 seconds) may be generated by a reuse of the second free block BL19. That is, a reuse delay period Td of two seconds may be generated as both the third free block BL20 and the second free block BL19 are reused.

Accordingly, when a first free block BL18 is reused after the third free block BL20 and the second free block BL19 are reused, a reuse period of the first free block BL18 may be extended as much as a reuse delay period Td (for example, 2 seconds). An extended reuse period (for example, 6 seconds+2 seconds=8 seconds) of the first free block BL18 may be smaller than the reuse constraint period Tr (for example, 10 seconds).

At the time T2 when the first garbage collection operation GC1 is completed, when it is assumed that a reuse delay period of one second is generated whenever one free block is generated, at least four free blocks in addition to the first free block BL18 are required to satisfy the reuse constraint period Tr (for example, 10 seconds) of the first free block BL18.

Since a reuse delay period of four seconds (for example, 4*1 second) is generated as four free blocks are reused, the first free block BL18 may be reused in a state of satisfying the reuse constraints. As a result, the second reference value N2 may be decided as 5 (=1+4).

The controller 100 may perform a second garbage collection operation GC2 at time T3 on blocks and additionally generate two free blocks BL16 and BL17 in addition to three free blocks BL18 to BL20 based on the decided second reference value.

Figure 8:
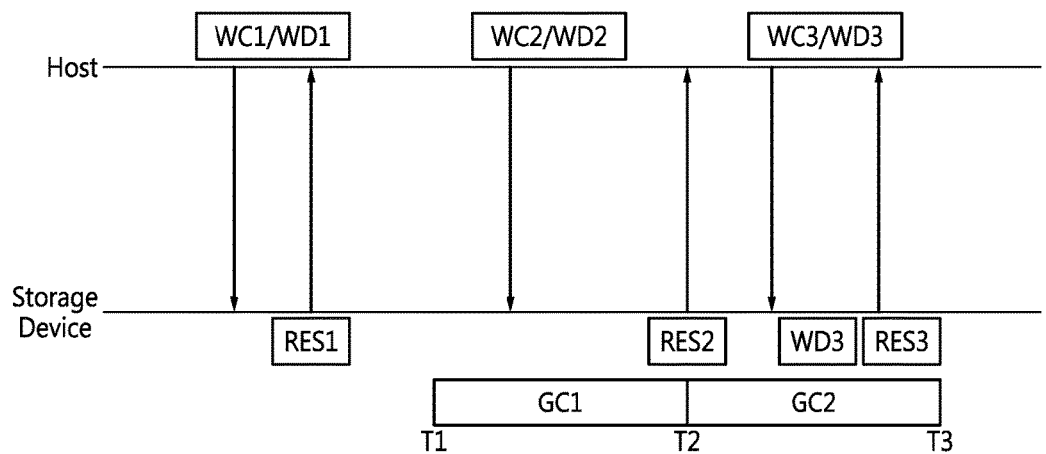
FIG. 8 is a conceptual diagram for describing an operation of the data processing system of FIG. 1.
Figure 9:
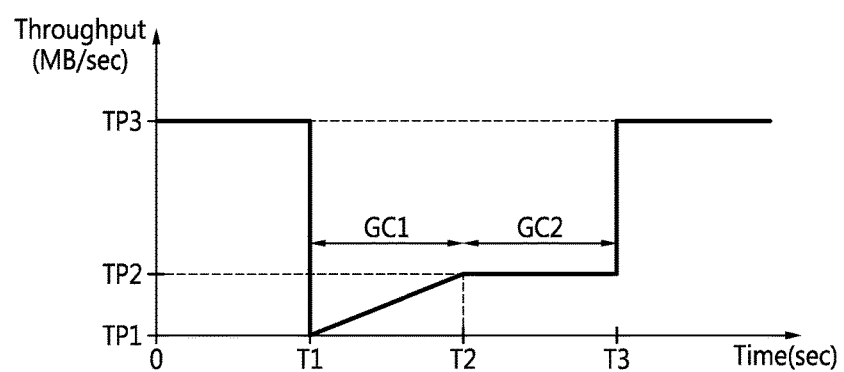
FIG. 9 is a graph which shows a write data throughput rate of a storage device according to an operation of FIG. 8.
Figure 10:
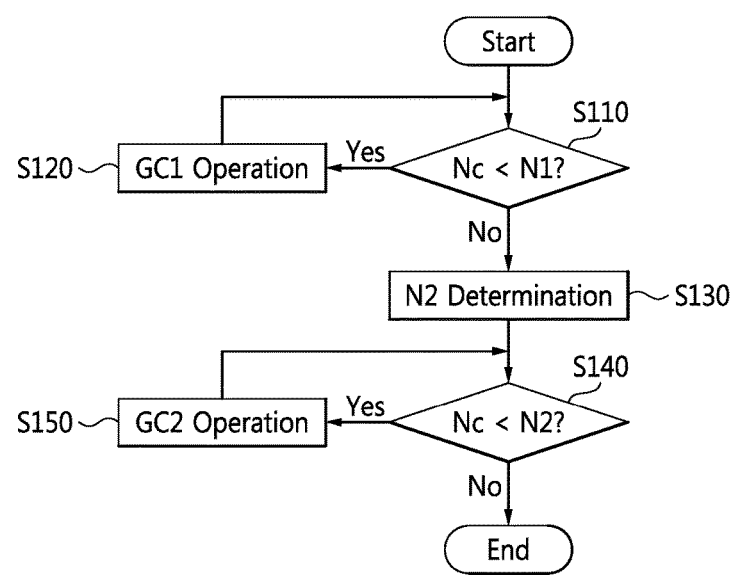
FIG. 10 is a flowchart which shows a process of operating the storage device according to exemplary embodiments of the present disclosure.

FIG. 8 is a conceptual diagram for describing an operation of the data processing system of FIG. 1, FIG. 9 is a graph which shows a write data throughput rate of a storage device according to an operation of FIG. 8, and FIG. 10 is a flowchart which shows a process of operating the storage device according to exemplary embodiments of the present disclosure.

Referring to FIGS. 1, 2, 8, 9, and 10, the storage device 40 may receive a first write command WC1 and first write data WD1 from the host 30. The controller 100 of the storage device 40 may write the first write data WD1 in the non-volatile memories 300 in response to the first write command WC1 and transmit a first response RES1 indicating that a first write operation is completed to the host 30.

The controller 100 may determine whether the number Nc of free blocks among the blocks BLs included in each of the non-volatile memories 300 is smaller than the first reference value N1 (S110). The first reference value N1 may be a minimum value for triggering the garbage collection operation and may be variously set according to the FTL 145 performed by the controller 100.

When the number Nc of free blocks is smaller than the first reference value N1, the controller 100 may perform the first garbage collection operation GC1 until the number Nc of free blocks is equal to the first reference value N1 (S120).

While the first garbage collection operation is performed, the controller 100 may sequentially increase a write data throughput rate of the storage device 40 from a first value TP1 to a second value TP2. That is, while the first garbage collection operation is performed, the controller 100 may increase the write data throughput rate of the storage device 40 in proportion to the number Nc of free blocks. For example, a first value TP1 may be 0 MB/sec at the time T1 when the first garbage collection operation is started, and a second value TP2 may be 100 MB/sec at the time T2 when the first garbage collection operation is completed.

While the first garbage collection operation is performed, the controller 100 may receive a second write command WC2 and second write data WD2 from the host 30. The controller 100 may transmit a second response RES2 for the second write command to the host 30 at the time T2 when the first garbage collection operation is completed. That is, while the first garbage collection operation is performed, the controller 100 may not perform a write operation.

When the first garbage collection operation GC1 is completed, the controller 100 may decide a second reference value N2 for the second garbage collection operation GC2 (S130). The second reference value N2 may be set to be a value larger than the first reference value N1, and when the first free block BL18 generated by the first garbage collection operation GC1 is reused, the second reference value may be set so that the first free block BL18 satisfies the reuse constraints.

The controller 100 may determine whether the number Nc of free blocks is equal to the second reference value N2, and perform the second garbage collection operation GC2 until the number Nc of free blocks is equal to the second reference value N2 (S140, S150).

While the second garbage collection operation GC2 is performed, the controller 100 may receive a third write command WC3 and third write data WD3 from the host 30. The controller 100 may write the write data WD3 in the non-volatile memories 300 in response to the third write command WC3, and transmit a third response RES3 indicating that a write operation is completed to the host 30. The controller 100 may perform a write operation according to the third write command WC3 and the second garbage collection operation GC2 at the same time (or to be overlapped in parallel and in time).

While the second garbage collection operation GC2 is performed, the controller 100 may constantly maintain the write data throughput rate of the storage device 40 to be the second value TP2. For example, the second value TP2 may be about 100 MB/sec which is a throughput rate at the time T2 when the first garbage collection GC1 is completed.

At a time T3 when the second garbage collection operation GC2 is completed, the controller 100 may change a write data throughput rate of the storage device 40 to be a third value TP3 larger than the second value TP2. For example, the third value TP3 may be about 500 MB/sec.

Figure 11:
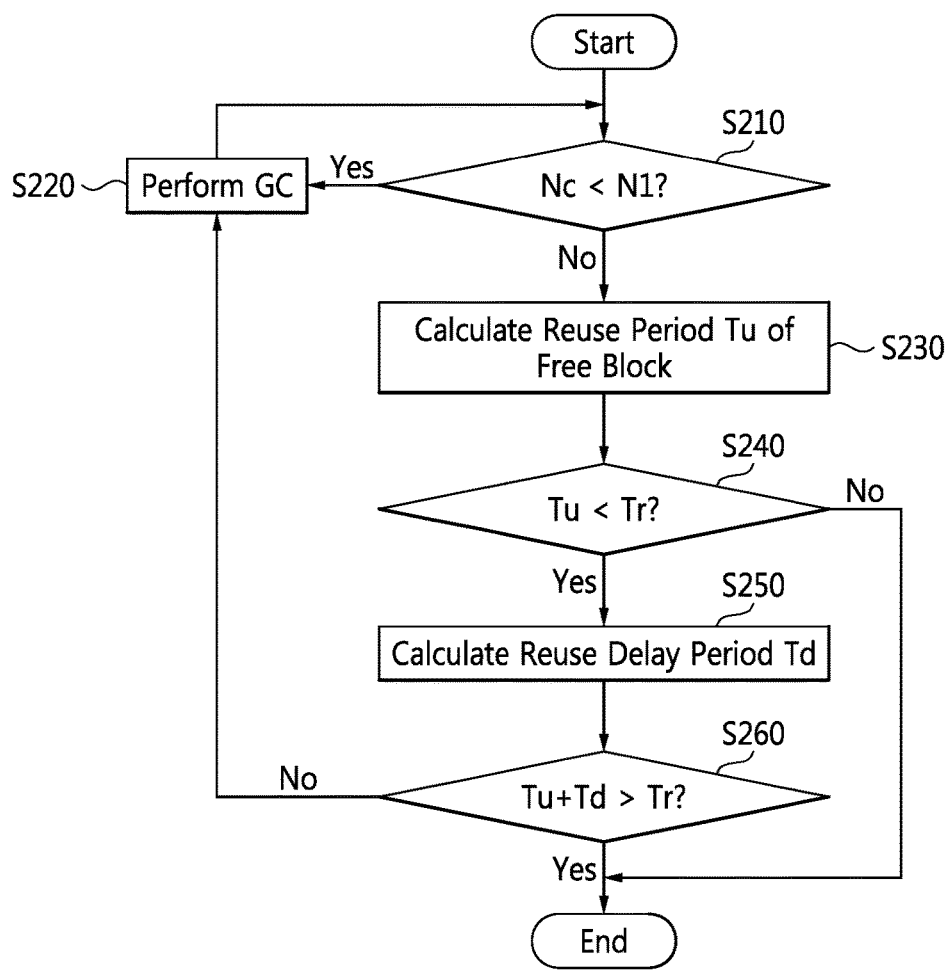
FIG. 11 is a flowchart which shows a process of operating the storage device according to exemplary embodiments of the present disclosure.

FIG. 11 is a flowchart which shows a process of operating the storage device according to exemplary embodiments of the present disclosure. Referring to FIGS. 1, 2, 6, and 12, the controller 100 may check the number Nc of free blocks among the blocks BLs included in each of the non-volatile memories 300, and compare the number Nc of free blocks with the first reference value N1 (S210).

When the number Nc of free blocks is smaller than the first reference value N1, the controller 100 may perform the first garbage collection operation until the number Nc of free blocks is equal to the first reference value N1 (S220).

After the first garbage collection operation is completed, the controller 100 may calculate a reuse period Tu of a first free block generated by the first garbage collection operation (S230). The reuse period Tu refers to a time difference between a time when a corresponding block is started to be used and a current time tC. Here, the time when the corresponding block is started to be used may refer to a latest erased time tE of the corresponding block.

The controller 100 may compare the calculated reuse period Tu of a first free block with the reuse constraint period Tr (S240). When the reuse period Tu of a first free block is larger than the reuse constraint period Tr, the controller 100 may end a garbage collection operation.

When the reuse period Tu of a first free block is smaller than the reuse constraint period Tr (for example, the reuse period Tu of a first free block is 6 seconds and the reuse constraint period Tr is 10 seconds), the controller 100 may calculate a reuse delay period Td of the first free block (S250).

The reuse delay period Td of the first free block may refer to an entire period of time consumed in sequentially programming data in fourth free blocks (for example, BL19 and BL20) except for the first free block BL18 among remaining free blocks after the first garbage collection operation is completed.

For example, when it is assumed that a period of time consumed in programming respective data in each of all pages included in a block is one second, and the number of the fourth free blocks (for example, BL19 and BL20) is two, the reuse delay period Td of the first free block may be two seconds.

The controller 100 may compare a sum of the calculated reuse period Tu of the first free block and the calculated reuse delay period Td of the first free block with the reuse constraint period Tr (S260). When the sum of the reuse period Tu of the first free block and the reuse delay period Td of the first free block is larger than the reuse constraint period Tr, the controller 100 may end a garbage collection operation.

When the sum of the reuse period Tu of the first free block and the reuse constraint period Tr of the first free block is smaller than the reuse constraint period Tr (for example, when the reuse period Tu of the first free block BL18 is 6 seconds, the reuse delay period Td of the first free block BL18 is 2 seconds, and the reuse constraint period Tr is 10 seconds), the controller 100 may perform a second garbage collection operation to generate an additional free block (S220).

A method of operating a storage controller according to an exemplary embodiment of the present disclosure can improve reliability of a storage device by adjusting the number of free blocks among blocks included in a non-volatile memory and ensuring a reuse time interval of blocks.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Although a few embodiments of the present general disclosure have been shown and described, it will be appreciated by those skilled in the art that changes may be made in these embodiments without departing from the principles and spirit of the general disclosure, the scope of which is defined in the appended claims and their equivalents.

What is claimed is:

1. A method of operating a storage controller for controlling an operation of a storage device including blocks, the method comprising:
    determining whether the number of free blocks among the blocks is smaller than a first reference value
    in response to determining the number of free blocks is smaller than the first reference value, performing a first garbage collection operation on the blocks until the number of free blocks within the storage device is equal to the first reference value; and
    responsive to a first free block recovered by the first garbage collection operation is expected to be unavailable for reuse at an expected reuse time, performing a second garbage collection operation on the blocks until the number of free blocks within the storage device is larger than the first reference value and is equal to a second reference value, wherein the first free block is unavailable for reuse when a period since a latest erasure of the first free block is less than a minimum delay period and is otherwise available.

2. The method of claim 1, wherein the first and the second garbage collection operations are successively performed.

3. The method of claim 1, further comprising:
    receiving a write command and write data; and
    writing the write data in the storage device in response to the write command and, at a same time, performing the second garbage collection operation.

4. The method of claim 1, wherein the storage controller maintains a constant write data throughput rate of the storage device while the second garbage collection operation is performed.

5. The method of claim 1, wherein the storage controller sequentially increases a throughput rate of the storage device from a first value to a second value while the first garbage collection operation is performed, maintains the throughput rate to be the second value while the second garbage collection operation is performed, and changes the throughput rate to be a third value larger than the second value after the second garbage collection operation is completed.

6. The method of claim 1, further comprising determining the second reference value, when the first free block generated by the first garbage collection operation is reused, so that the first free block satisfies reuse constraints.

7. The method of claim 6, wherein the determining of the second reference value includes calculating a reuse period of the first free block and a reuse delay period of the first free block.

8. The method of claim 7, wherein the reuse period is a difference between a time of the latest erasure of the first free block and a current time.

9. The method of claim 7, wherein the reuse delay period is an entire period consumed in sequentially programming corresponding data in each of second free blocks, excluding the first free block, among all free blocks within the storage device when the first garbage collection operation is completed.

10. A method of operating a storage device which includes a non-volatile memory and a controller for controlling the non-volatile memory, the method comprising:
    determining, by the controller, whether a number of free blocks among blocks included in the non-volatile memory is smaller than a first reference value;
    in response to determining the number of free blocks is smaller than the first reference value, performing, by the controller, a first garbage collection until the number of free blocks is equal to the first reference value; and
    responsive to a first free block recovered by the first garbage collection is expected to be unavailable for reuse at an expected reuse time, performing a second garbage collection on the blocks until the number of free blocks within the storage device is larger than the first reference value and is equal to a second reference value, wherein the first free block is unavailable for reuse when a period since a latest erasure of the first free block is less than a minimum delay period and is otherwise available.

11. The method of claim 10, further comprising:
    receiving, by the controller, a write command and write data from a host; and
    writing, by the controller, the write data in the non-volatile memory in response to the write command and, at a same time, performing the second garbage collection.

12. The method of claim 10, wherein the controller sequentially increases a throughput rate of the non-volatile memory from a first value to a second value while the first garbage collection is performed, maintains the throughput rate to be the second value while the second garbage collection is performed, and changes the throughput rate to be a third value larger than the second value after the second garbage collection is completed.

13. The method of claim 10, wherein the non-volatile memory includes a memory cell array and the memory cell array includes three-dimensional memory cells.

14. A method, executed by a memory controller, of controlling a nonvolatile memory whose memory cells are erased in units of memory blocks, the method comprising:
    executing a first garbage collection operation to recover, for reuse, one or more free memory blocks among all memory blocks of the nonvolatile memory; and executing a second garbage collection operation to recover, for reuse, a number of additional free memory blocks among all of the memory blocks of the non-volatile memory responsive to a particular free memory block of the one or more free memory blocks recovered by the first garbage collection operation is expected to be unavailable for reuse at an expected reuse time, wherein each of the free memory blocks is unavailable for reuse when a period since a last erasure of each of the free memory blocks is less than a minimum delay period and is otherwise available.

15. The method of claim 14, wherein the expected reuse time is an arithmetic product of an expected period of time to complete a reuse of one of the free memory blocks and a number of existing free memory blocks that are available for reuse before the particular free memory block.

16. The method of claim 14, further comprising selecting the number of additional free memory blocks to be recovered for reuse by the second garbage collection operation based upon an expected period of time to complete a reuse of one of the free memory blocks and a number of existing free memory blocks that are available for reuse before the particular free memory block becomes available for reuse.

17. The method of claim 16, wherein the number of additional free memory blocks is selected such that a product of the expected period of time to complete a reuse of the one free memory block and a sum of the number of additional free memory blocks and the number of existing free memory blocks that will be available for reuse, before the particular free memory block becomes available for reuse, equals or exceeds a difference between the minimum delay period and a period since last erasure of the particular free memory block.

* * * * *